US012415329B2

(12) United States Patent
Schalk

(10) Patent No.: US 12,415,329 B2

(45) Date of Patent: Sep. 16, 2025

(54) DRIVE MECHANISM FOR A PACKAGING MATERIAL WEB COILER, PACKAGING MATERIAL COILER, COILED PACKAGING MATERIAL CUSHION, AND DEVICE FOR MANUFACTURING THE SAME

(71) Applicant: Sprick GmbH Bielefelder Papier—und Wellpappenwerke & Co., Bielefeld (DE)

(72) Inventor: Bastian Schalk, Detmold (DE)

(73) Assignee: Sprick GmbH Bielefelder Papier—und Wellpappenwerke & Co., Bielefeld (DE)

(*) Notice: Subject to any disclaimer, the term of this patent is extended or adjusted under 35 U.S.C. 154(b) by 456 days.

(21) Appl. No.: 17/278,901

(22) PCT Filed: Sep. 16, 2019

(86) PCT No.: PCT/EP2019/074715
§ 371 (c)(1),
(2) Date: Mar. 23, 2021

(87) PCT Pub. No.: WO2020/064402
PCT Pub. Date: Apr. 2, 2020

(65) Prior Publication Data

US 2022/0040953 A1 Feb. 10, 2022

(30) Foreign Application Priority Data

Sep. 24, 2018 (DE) ......................... 102018007549.5

(51) Int. Cl.
*B31D 5/00* (2017.01)

(52) U.S. Cl.
CPC .... *B31D 5/0039* (2013.01); *B31D 2205/0029* (2013.01); *B31D 2205/007* (2013.01); *B31D 2205/0082* (2013.01)

(58) Field of Classification Search
CPC .......... B31D 5/0039; B31D 2205/0029; B31D 2205/007; B31D 2205/0082
See application file for complete search history.

(56) References Cited

U.S. PATENT DOCUMENTS

| | | | | |
|---|---|---|---|---|
| 565,054 A * | 8/1896 | Trembly | ................ | B65H 49/32 242/388.7 |
| 1,354,369 A * | 9/1920 | Anderson | ............ | B65H 54/585 242/537 |

(Continued)

FOREIGN PATENT DOCUMENTS

| | | |
|---|---|---|
| DE | 202012009025 U1 | 12/2012 |
| DE | 102012018867 A1 | 3/2014 |

(Continued)

OTHER PUBLICATIONS

Notice of Transmittal of the International Search Report and the Written Opinion of the International Searching Authority, or the Declaration dated Jan. 30, 2020, PCT Application No. PCT/EP2019/074715.

*Primary Examiner* — Gloria R Weeks
*Assistant Examiner* — Katie L Gerth
(74) *Attorney, Agent, or Firm* — Banner & Witcoff Ltd.

(57) ABSTRACT

A drive mechanism for a packaging material web coiler for forming a wound-up packaging material cushion may include a coiler core and a rotatable gyrating mass coupled to the coiler core. The coiled packaging material web is coilable around the coiler core such that the coiled packaging material cushion is detachable from the coiler core. With the rotatable gyrating mass, the coiler core performs at least one complete winding of the packaging material web around the coiler core in response to a manual swing-actuation.

23 Claims, 10 Drawing Sheets

(56) References Cited

Figure 1:
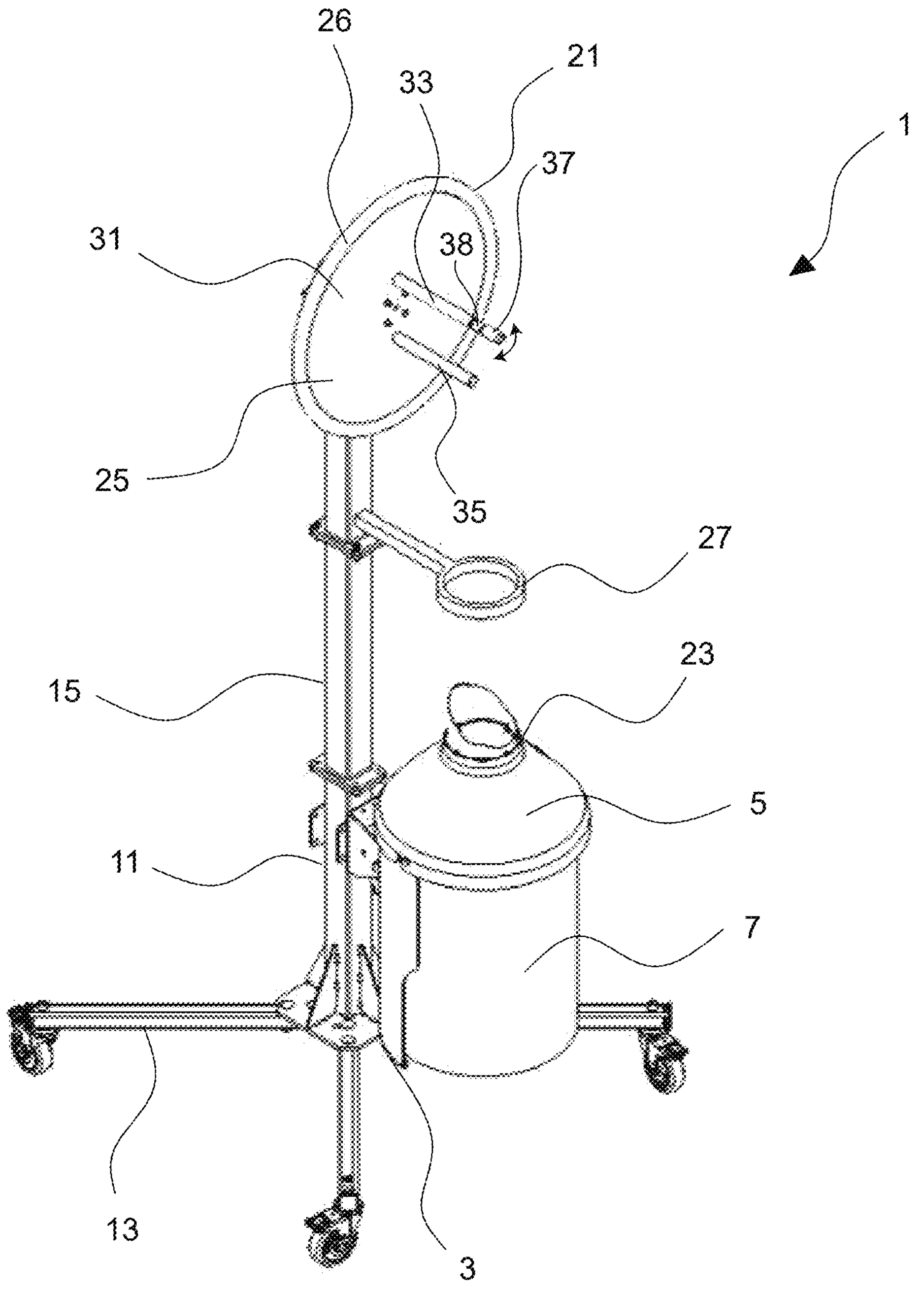

U.S. PATENT DOCUMENTS 1,831,848 A * 11/1931 Doney ................. B65H 49/305 242/574
3,743,208 A * 7/1973 Schmitz ............. B65H 75/2263 242/118.8
4,066,225 A * 1/1978 Bauer .................... B65H 75/14 242/118.8
4,161,298 A * 7/1979 Davis ................... B65H 54/585 242/532.6
4,192,473 A * 3/1980 Wellman ................ B65H 49/30 242/129
4,237,776 A * 12/1980 Ottaviano ............ B31D 5/0047 493/967
4,265,414 A * 5/1981 Spradling ............ B65H 54/585 242/537
5,388,609 A * 2/1995 Ghio ...................... A62C 33/04 137/355.27
5,505,404 A * 4/1996 Dubreuil ................ A62C 33/02 242/395
5,566,901 A * 10/1996 Wilder ................. B65H 54/585 242/395
5,961,061 A * 10/1999 Stanley ................ B65H 54/585 242/395
6,206,317 B1 * 3/2001 Harvestine ........... B65H 54/585 242/395
6,241,175 B1 * 6/2001 Nichols ................ B65H 54/585 137/355.27
6,606,839 B1 * 8/2003 Suda ..................... B65B 63/024 53/430
6,626,812 B1 * 9/2003 Harding ............... B31D 5/0047 493/464
6,626,813 B1 * 9/2003 Ratzel .................... B65H 18/08 493/464
D480,623 S * 10/2003 Miller ............................ D8/359
7,243,875 B2 * 7/2007 Holub ................... B65B 63/024 242/532.6
7,766,270 B2 * 8/2010 Piepgras .............. B65H 54/585 242/395
7,803,100 B2 * 9/2010 Lu .......................... B65D 81/09 493/344
8,683,777 B2 * 4/2014 Armington ............. B65B 61/22 53/472
9,676,590 B1 * 6/2017 Berry ..................... B65H 54/58
9,908,738 B1 * 3/2018 Tóth ..................... B65H 49/305
9,937,682 B2 * 4/2018 Schmid ................ B31D 5/0039
10,252,484 B2 * 4/2019 Winkens ................ B65H 18/08
10,414,624 B1 * 9/2019 Berry ................... B65H 75/425
10,864,696 B2 * 12/2020 Lammers ............. B65H 54/585
2004/0089761 A1 * 5/2004 Tsao ....................... A62C 33/04 242/532.6
2006/0006274 A1 * 1/2006 Holub ................... B65B 63/024 53/119
2006/0096708 A1 * 5/2006 Robinson ............. B65H 18/028 156/352
2007/0145176 A1 * 6/2007 Fasser .................... B65H 75/40 137/355.27
2007/0145179 A1 * 6/2007 Engelsher ............. A61F 15/007 242/532.6
2008/0167171 A1 * 7/2008 Keller ..................... B65B 3/003 493/30
2008/0261794 A1 * 10/2008 Slovencik .............. B26D 1/205 493/370
2009/0302147 A1 * 12/2009 Emoto ................... B65H 19/28 242/532.6
2010/0127112 A1 * 5/2010 Aquarius ............... B65H 20/02 242/564.3
2012/0165172 A1 * 6/2012 Wetsch .................. B65H 20/26 493/464
2014/0274645 A1 * 9/2014 Wetsch .................. B65H 20/26 493/360
2015/0273784 A1 * 10/2015 Schmid ................ B65H 35/008 242/562
2016/0001519 A1 * 1/2016 Winkens .............. B31D 5/0069 156/361
2016/0082685 A1 * 3/2016 Chan .................... B31D 5/0043 493/464
2018/0099470 A1 * 4/2018 Wetsch ................ B31D 5/0039
2018/0126686 A1 * 5/2018 Nelson ................. B65H 35/008
2018/0304571 A1 * 10/2018 Lammers ............... B31D 5/006
2022/0097338 A1 * 3/2022 Van Der Kaap ..... B65H 54/585
2024/0109747 A1 * 4/2024 Jiang .................... B65H 54/585

FOREIGN PATENT DOCUMENTS

DE 102012018941 A1 3/2014
EP 1645407 B1 11/2006
WO 9921702 A2 5/1999
WO 2006087511 A1 8/2006
WO 201412706 A1 1/2014
WO 2019185614 A1 10/2019

* cited by examiner

DRIVE MECHANISM FOR A PACKAGING MATERIAL WEB COILER, PACKAGING MATERIAL COILER, COILED PACKAGING MATERIAL CUSHION, AND DEVICE FOR MANUFACTURING THE SAME

CROSS REFERENCE TO RELATED APPLICATIONS

This patent application is a U.S. National Stage Application of PCT/EP2019/074715, filed on Sep. 16, 2019, which claims priority to German Patent Application No. 102018007549.5, filed Sep. 24, 2018. Each of these applications is incorporated herein by reference in its entirety.

BACKGROUND

Field

The disclosure relates to a drive mechanism for a packaging material web coiler for forming a coiled packaging material cushion, such as a cushioning reel. Furthermore, the disclosure relates to a packaging material web coiler for forming the coiled packaging material cushion, such as a cushioning reel, and to the coiled packaging material cushion, such as a cushioning reel as such. Lastly, the disclosure relates to a process for manufacturing a wound-up packaging material cushion, such as a cushioning reel.

Related Art

In order to form packaging cushions in particular from paper, preferably recycling paper, different manufacturing systems unknown. Thereby, it is possible to differentiate between two fundamental types of packaging material deformation machines. For one machine, a web-shaped packaging supply material is provided with a so-called Leporello-stack and drawn therefrom, so as to subsequently fold the two edge sections above one another towards the center of the packaging material web. The edge sections folded above one another are fastened for fixation by a plastic embossing deformation, so that a hose-shaped packaging material web or cushioning web is formed. For another type of machine, the web-shaped packaging supply material is realized by a packaging material roll. The cushioning web of packaging material for this type of machine is realized by drawing the packaging material web from the inner side of the packaging material roll. The packaging web differs from the above-mentioned one by extending spiral-shaped in the web direction. Usually, the spiral-shaped packaging material web does not have a central embossing deformation.

It is known, to coil for example such packaging materials webs to a coiled packaging cushioning, which may be utilized as a separate, free-made cushioning product. The more often the packaging material web is wound-up, the larger the diameter of the disk-shaped, coiled packaging material cushion becomes. Such a machine for manufacturing a coiled packaging material cushion is known from EP 1 645 407 B 1. Through a driving device operating a main drive shaft and thereby realizing a central deformation as well as a severing operation, also a coiling device is coupled, causing the winding-up of the cushioning material web. From WO 2014/12706 A1, another packaging conversion system is known, in which a packaging supply material is formed into a packaging material web. Through its own drive and a control associated with the drive, the packaging material web may be converted into a packaging material disk. Additionally, a cushioning discharge mechanism is provided which peels the finished cushioning product from the coiling mechanism. For the mentioned coiling mechanism is applicable, that a substantial design effort is required to realize the operation of a reliable cushioning coiler. The packaging material conversion machines, which already require a large area, become even more extensive when supplied with the known coiler device. Additionally, the known coiler devices are individually adapted to the respective upstream conversion machine such that of flexible application of coiler devices is not easily realized.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 2:
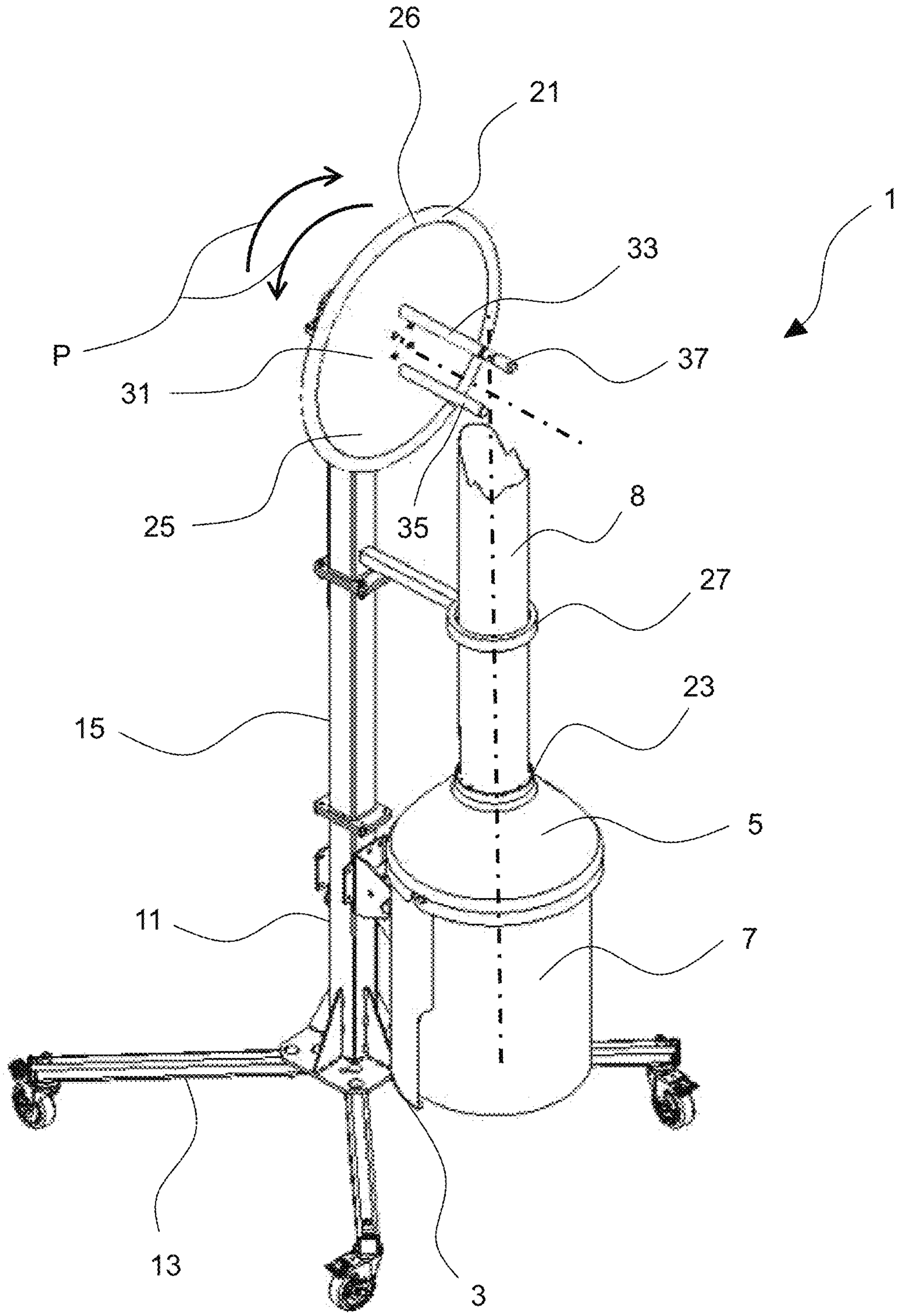
Figure 3:
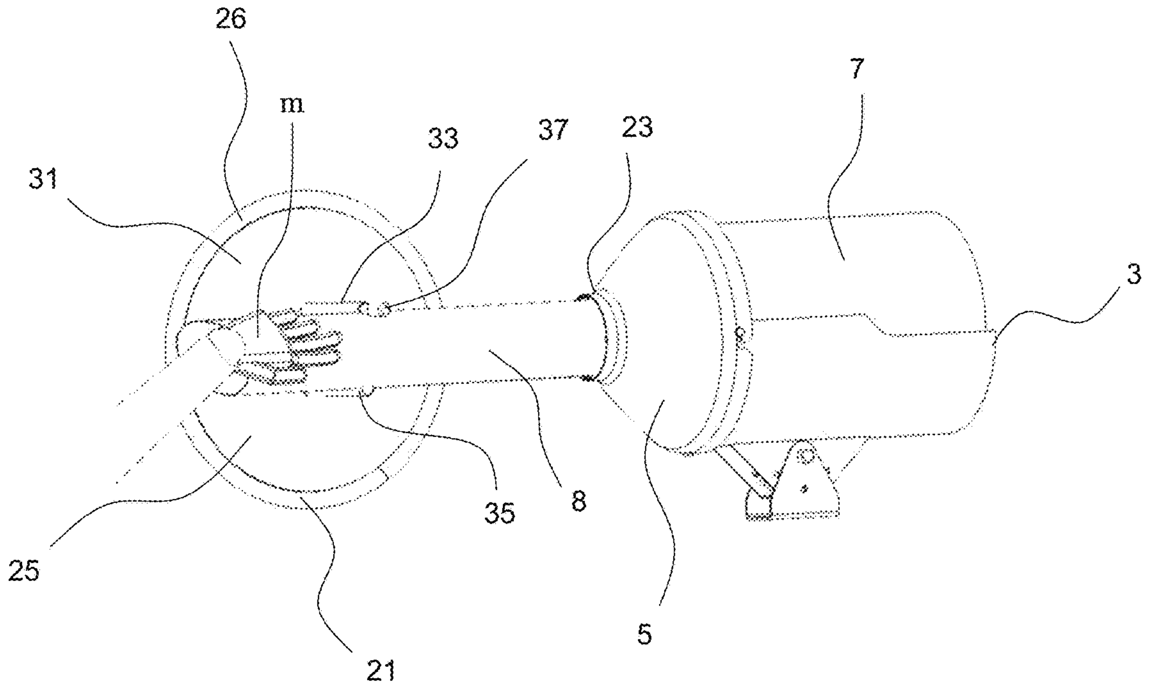
Figure 4:
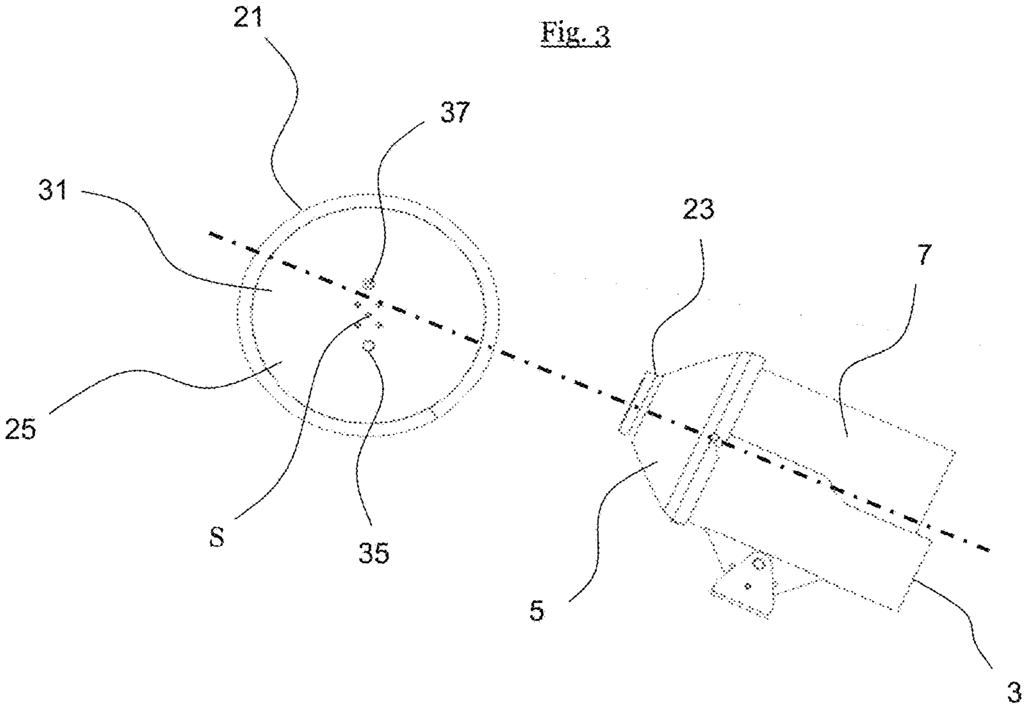
Figure 5:
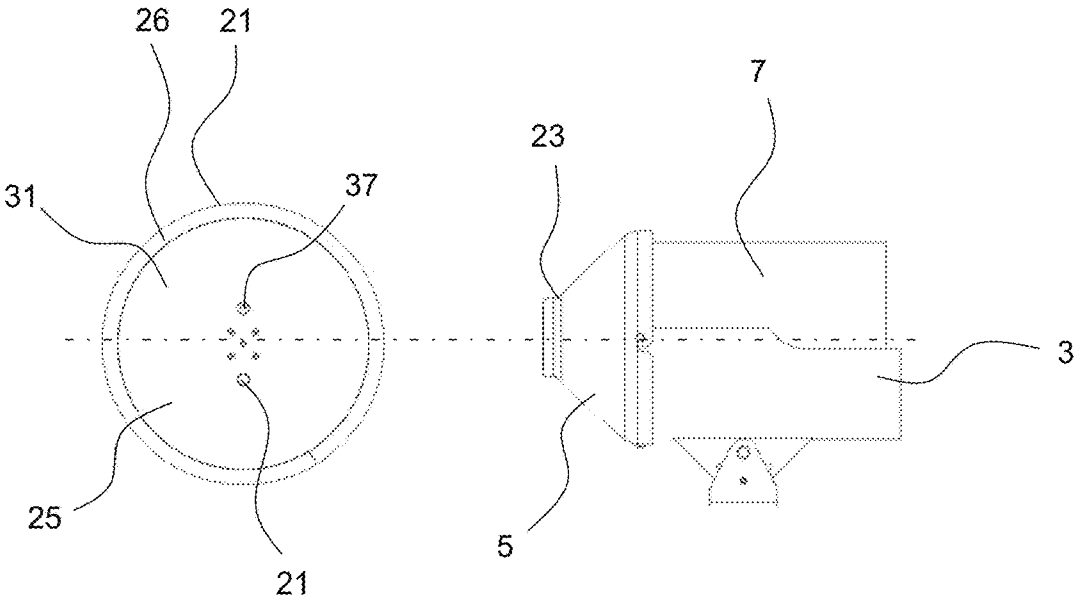
Figure 6:
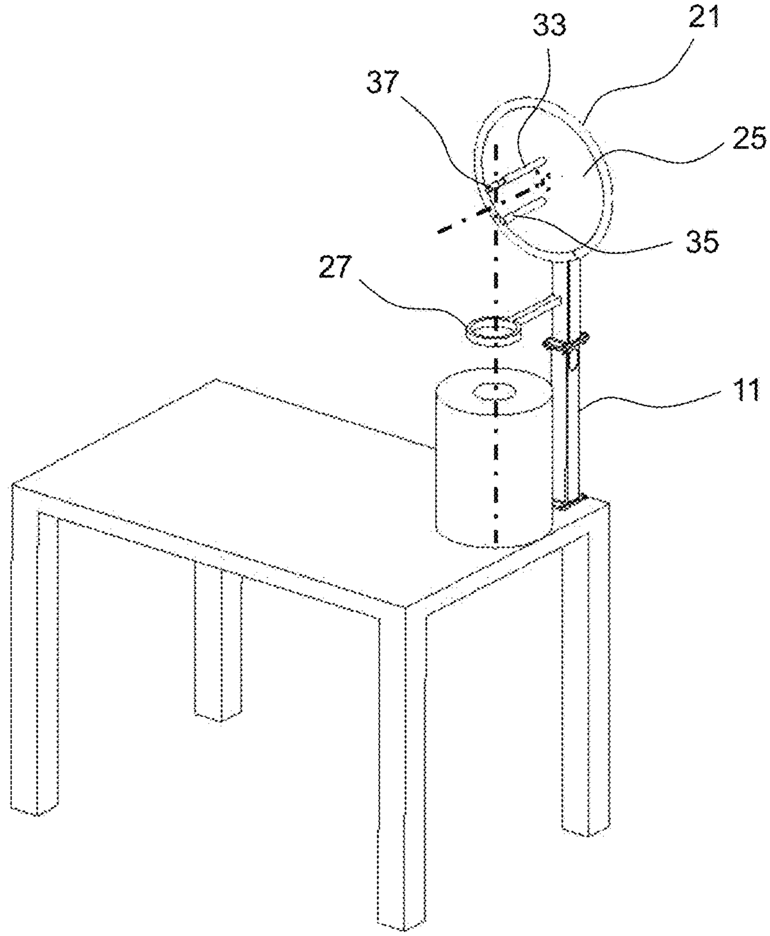
Figure 7:
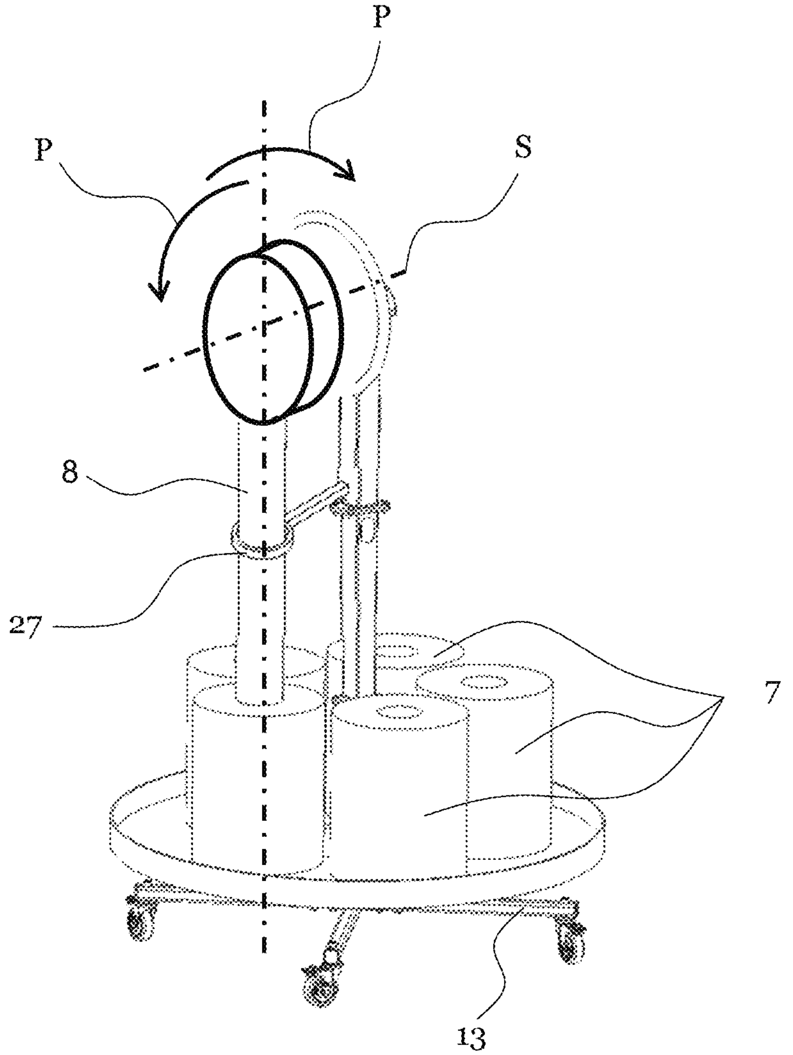
Figure 8:
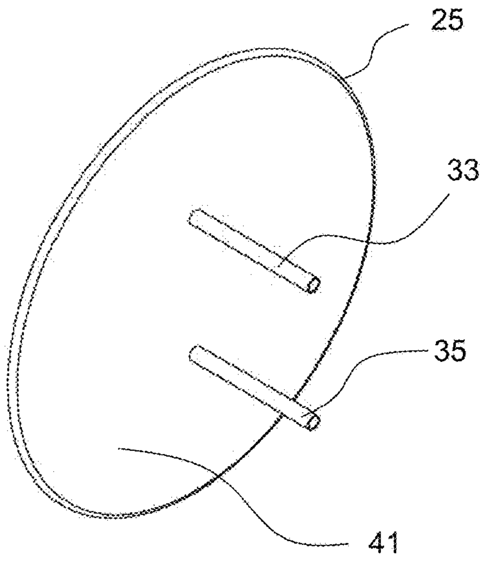
Figure 9:
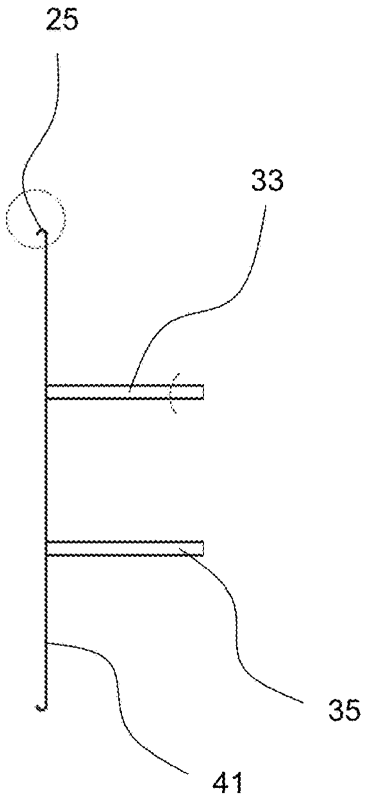
Figure 10:
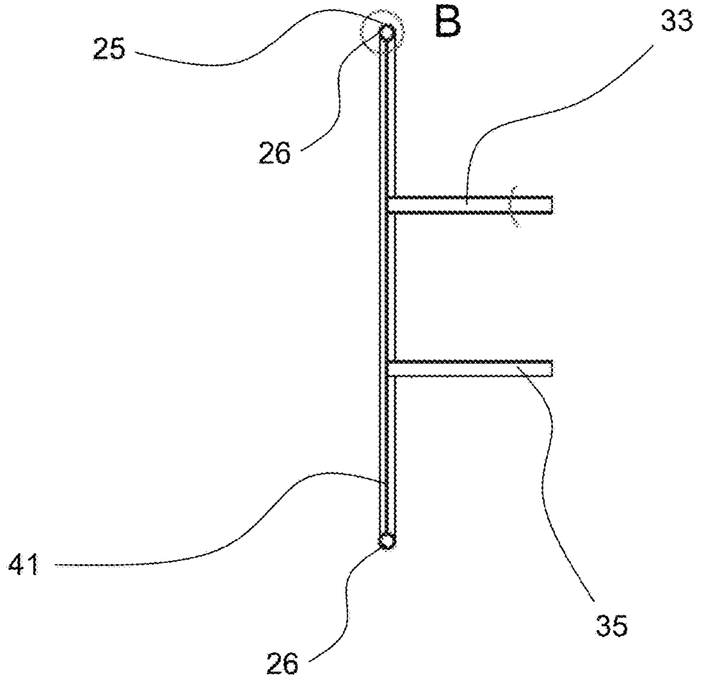
Figure 11:
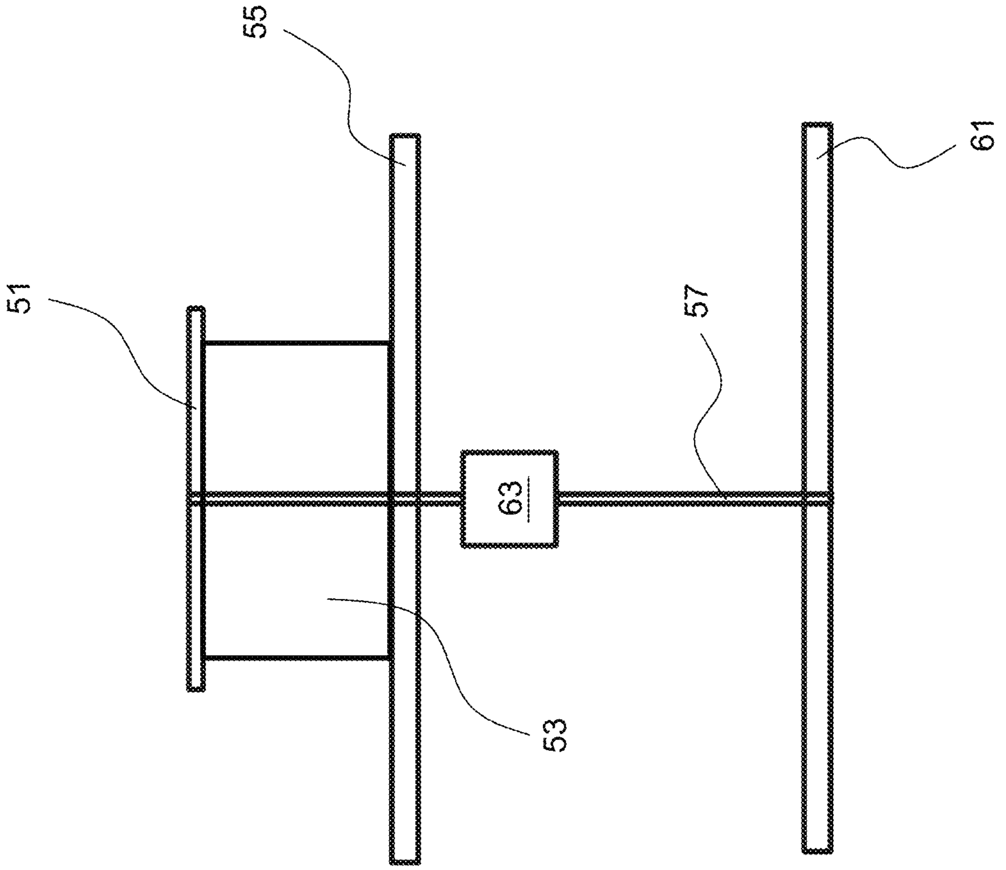
Figure 12:
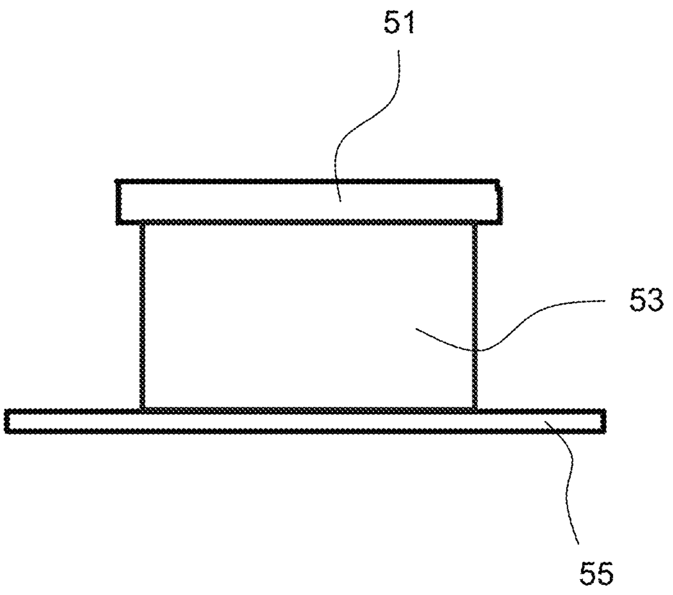
Figure 13:
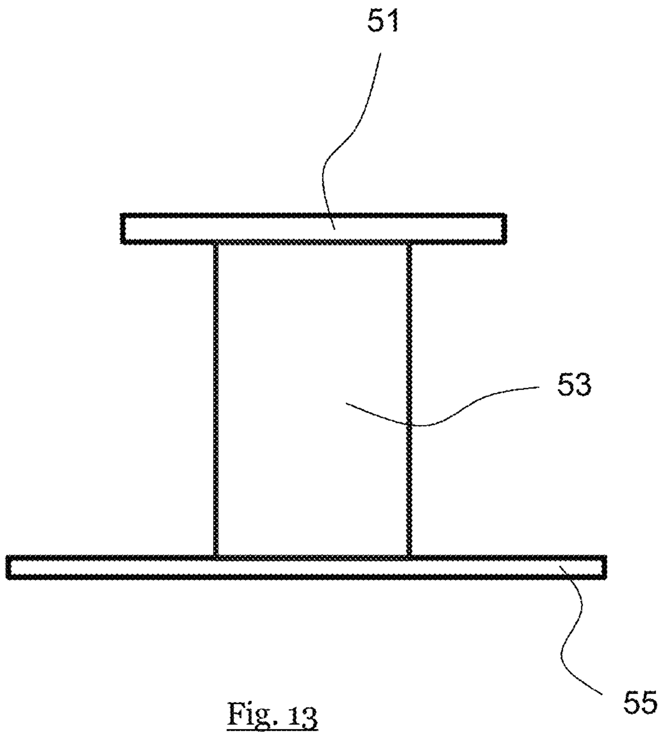
Figure 14:
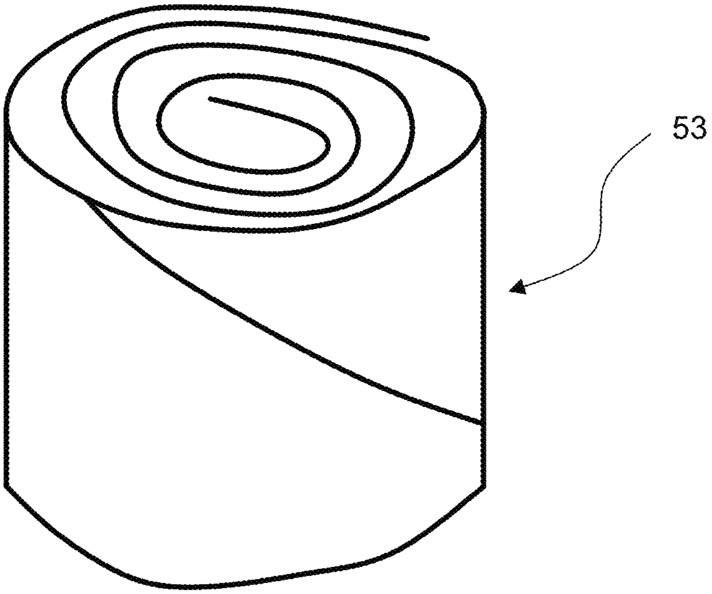
Figure 15:
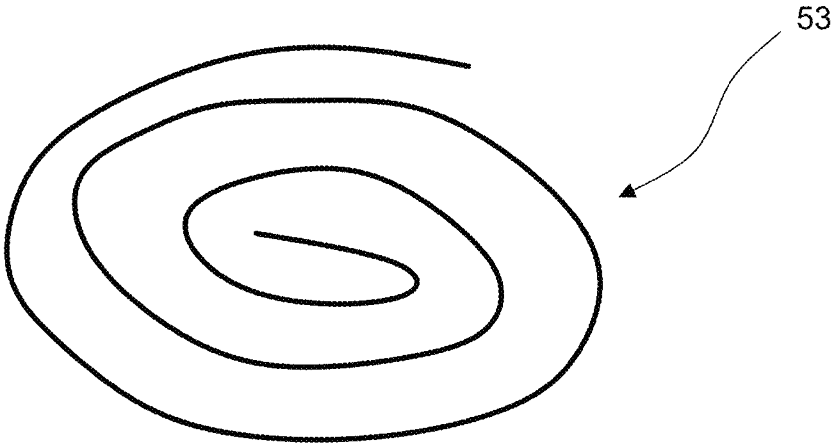
Figure 16:
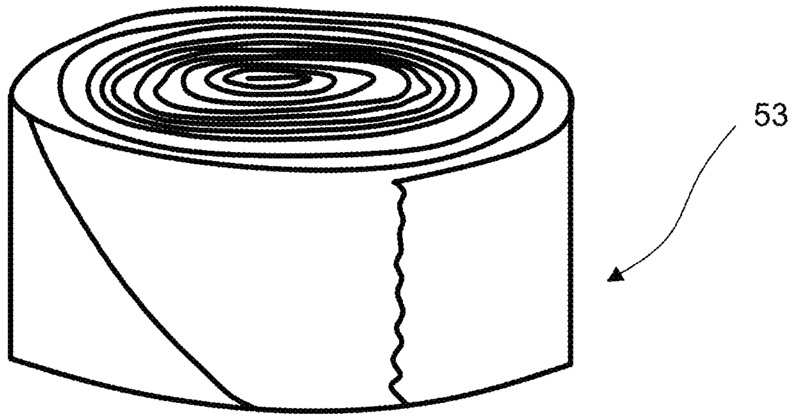
Figure 17:
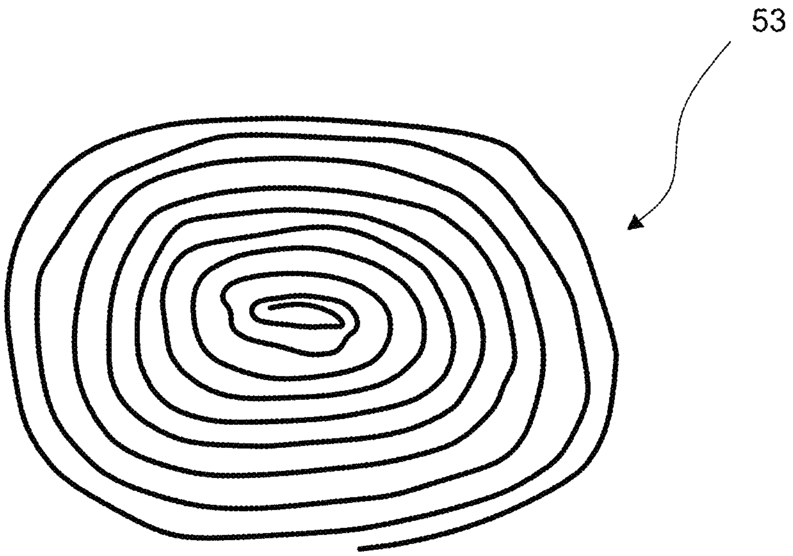

FIG. 1 a perspective view of the packaging material web coiler according to the disclosure with a drive mechanism according to the disclosure;

FIG. 2 a perspective view of the packaging material web coiler according to FIG. 1, wherein the packaging material web is drawn from a packaging material supply roll so as to thread it into a drive mechanism according to the disclosure;

FIG. 3 a perspective schematic view in which an operating person threats the packaging material web to the packaging material web coiler;

FIG. 4 a side view of the coiler assembly according to the disclosure, consisting of a drive mechanism according to the disclosure and the packaging material conversion device with which a spiral-shaped packaging material web is drawn from the inner side of the packaging material roll;

FIG. 5 a further side view of a further coiler assembly according to the disclosure, which differs thereby that the packaging material web dispensing direction from the packaging material conversion device corresponds to the rotary axis of the flywheel;

FIG. 6 a further perspective view of the further embodiment of a packaging material web coiler according to the disclosure;

FIG. 7 a perspective view of a further embodiment of a packaging material web coiler according to the disclosure having a supply of packaging material rolls;

FIG. 8 a perspective view of a drive mechanism according to the disclosure formed as a flywheel;

FIG. 9 a cross-sectional view of a flywheel according to the disclosure in a first embodiment;

FIG. 10 a cross-sectional view of the flywheel according to the disclosure in a further embodiment;

FIG. 11 schematic side view of the experimental setting for measuring the deformation of the packaging material cushion according to the disclosure with a repeatable load;

FIG. 12 a schematic side view of the experimental setting of FIG. 11, wherein the packaging material cushion is arranged in a horizontal orientation to measure the degree of deformation in the axial direction;

FIG. 13 a schematic side view of the experimental setting of FIG. 11, wherein the packaging material cushion is arranged in a vertical orientation in order to measure its degree of deformation in the radial direction; or FIG. 14 a perspective schematic view of a packaging material cushion according to the disclosure having at least three windings;

FIG. 15 a schematic top view onto a packaging material cushion;

FIG. 16 a perspective, schematic view onto a packaging material cushion having more than ten windings; and FIG. 17 a top view of the packaging material cushion according to the disclosure according to FIG. 16.

The exemplary embodiments of the present disclosure will be described with reference to the accompanying drawings. Elements, features and components that are identical, functionally identical and have the same effect are—insofar as is not stated otherwise—respectively provided with the same reference character.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure. The connections shown in the figures between functional units or other elements can also be implemented as indirect connections, wherein a connection can be wireless or wired. Functional units can be implemented as hardware, software or a combination of hardware and software.

It is an objective of the disclosure to overcome the disadvantages of the prior art, in particular to provide a coiled packaging material cushion, for which a small area demand is required, which may be made quickly and flexibly, in particular without having to apply substantial refurbishing of the conversion machine, wherein in particular the application of the packaging material web coiler is possible for both a packaging supply material in the form of a Leporello stack or roll from which material is drawn from the inner or outer side.

In aspects of the disclosure, inter alia, a drive mechanism for a packaging material coiler for forming a coiled packaging material cushion, such as a cushioning reel, is provided, which may in particular act without any supplementary driving energy, to overcome the coiling resistance forces, the drawing of the packaging material web and possibly further friction forces, etc. In particular, the drive mechanism according to one or more aspects of the disclosure comprises no electronic up pneumatic or hydraulic drive but utilizes particularly exclusively an energy storage for storing and dispensing kinetic energy, in particular rotary energy, which is preferably supplied manually from an operating person, exclusively through force of hand. The drive mechanism according to one or more aspects of the disclosure comprises at least one coiler core around which the packaging material web is coilable such that the coiled packaging material cushion is detachable from the coiler core. The coiler core is in particular of the genus not part of the coiled cushion to be manufactured, but rather a mount rigidly coupled to the drive device which remains on the drive mechanism and/or may be realized as a pair of prongs, a triplet of prongs, or the like. Preferably, the coiler core is formed by two prongs arranged distance from one another and possibly offset from a rotational axis of the rotatable gyrating mass.

The coiler core is, according to one or more aspects of the disclosure, coupled to the rotatable gyrating mass, in particular non-rotatably. Preferably, the coiler core is rigidly connected to the rotatable gyrating mass, wherein alternatively a transmission may be arranged between the coiler core and the rotatable gyrating mass. The transmission may be realized as a reduction gear unit or as a step-up gear unit so as to adapt the rotational speed of the coiler core to the respective, in particular manually, communicated rotary movement of the rotary gyrating mass.

The drive mechanism according to one or more aspects of the disclosure comprises this rotatable gyrating mass, which is mounted freely rotatable through smooth-running roller bearings and to which the coiler core is firmly attached to, and which is configured such that upon a manual swing-actuation, at least one complete winding of the packaging material web around the coiler core, preferably one and a half, two, two and a half, three or four windings, are completed. The rotatable gyrating mass, in particular the flywheel, has a mass inertia, wherein a rotary movement of the rotatable gyrating mass is stored with the least possible friction losses and may be supplied upon demand. The more mass the flywheel has a, the larger the provided mass inertia which is provided as a driving energy for the packaging material web coiler. Thereby, the gyrating mass or the mass inertia thereof may be constructively configured or defined such that a force of hand, and operating force provided by an operating person onto the gyrating mass, suffices to store the required rotational energy in the gyrating mass. For example, a force of hand of more than 5 kg, 10 kg, 15 kg, 20 kg, only 20 kg, 30 kg or 35 kg shall suffice to supply the rotatable gyrating mass with a sufficient rotational energy to form at least one winding, preferably 2, 3, 4 complete windings around the coiler core.

In this way it is possible to quickly and space-saving coil so-called packaging material reels having a cushioning function without any additional supplementary energy being required. It was shown that the manual drive mechanism according to one or more aspects of the disclosure barely tends to obstruct, such that delay times due to removing paper jam, maintenance/repair barely occur. Furthermore, the manual drive mechanism makes it possible to flexibly attach and to integrate the packaging material web coiler supplied with the manual drive mechanism into a packaging material conversion device, without having to change the construction of the packaging material conversion device. Examples for a packaging material conversion device are offered on the market by the applicant with the product names “SpeedMan” or “PaperJet”, which shall hereby be incorporated by reference into the disclosure. Preferably, the packaging material web coiler with drive mechanism is arranged in a short distance of less than 1 or 2 m from the dispensing opening of a respective packaging material conversion device.

The packaging material is in particular made of recycling paper. Recycling paper is in particular paper material having a low amount (less than 50%) of fresh fiber containing paper material. In particular paper materials comprising 70% to 100% used paper are preferred. The recycling paper in the sense of the present disclosure shall be a paper material having a tensile rigidity index along the running direction of the machine, in particular a tensile rigidity, of at most 90 Nm/g, preferably a tensile rigidity of 15 Nm/g, in particular of 30 Nm/g, to 60 Nm/g, and which may preferably have a tensile rigidity index across the running direction of the machine of at most 60 Nm/g, preferably a tensile rigidity of 5 Nm/g to 40 Nm/g. Determining the tensile rigidity or the tensile rigidity index can be made under consideration of norm DIN EN ISO 1924-2 or DIN EN ISO 1924-3. Additionally or alternatively, recycling paper characteristics or used paper characteristics may be characterized by the so-called bursting strength. Material in this sense is recycling paper having a bursting index of at most 3.0 kPa*m^s/g, in particular at most 2.8 kPa*m^s/g, preferably with a bursting index of 0.8 kPa*m^s/g to 2.5 kPa*m^s/g, in particular from 1.3 kPa*m^s/g to 2.2 kPa*m^s/g. For determining the bursting index, the norm DIN EN ISO 2758 is considered. Furthermore, the packaging material has an areal weight of in particular 40 g/m^2 to ma*. 150 g/m^2. The supply of packaging material may, according to the disclosure, be provided as a material web roll or as a zig-zag-folded or fan-folded packaging material stack, which may be called a Leporello-stack.

In a further aspect of the disclosure, the rotatable gyrating mass is configured such that exclusively the force of hand communicated from an operating person to the rotatable gyrating mass, and the kinetic rotational energy transferred to the rotatable gyrating mass through manual operation, is utilized as the coiling work for forming the coiled packaging material cushion. In particular, exclusively in the rotational energy of the gyrating mass is used to unwind the supply of packaging material, whereby in particular the packaging material web is formed, and to perform the winding-up for forming the packaging material reel, that is, the deformation of the web into the coiled reel.

In an exemplary embodiment of the disclosure, a mass inertia of more than 30 kg/cm$^2$, preferably more than 10 kg/cm$^2$, 15 kg/cm$^2$, 20 kg/cm$^2$, 30 kg/cm$^2$, 40 kg/cm$^2$, 45 kg/cm$^2$, 50 kg/cm$^2$ or 55 kg/cm$^2$, and preferably less than 500 kg/cm$^2$, 400 kg/cm$^2$, 300 kg/cm$^2$, 250 kg/cm$^2$, or 200 kg/cm$^2$, is for the rotatable gyrating mass. In an exemplary embodiment, the mass inertia lies between, in particular for a rotatable gyrating mass formed as a flywheel, having an outer diameter of less than 100 cm, 80 cm, 70 cm, 60 cm, 50 cm and/or more than 10 cm, 15 cm, or 20 cm.

The rotational energy stored in a flywheel depends on its mass inertia. The following formula applies:

Stored rotational energy: $E_{rot(w)}=\frac{1}{2}J_w w_0^2$; wherein

- $J_w$ is the mass inertia of the flywheel;
- $w_0$ is the angular velocity of the flywheel at time 0 (immediately after swinging the flywheel); $_0=2\pi\ n_0$; wherein $n_0$: rotational velocity.

The stored rotational energy ($E_{rot(\ )}$) is used for coiling a paper reel. When coiling, the rotational energy is transformed into friction energy until it is consumed and the gyrating mass possibly comes to rest (w=0).

The friction energy $E_{R\ complete}$ may for example be composed of:

$$E_{R\ complete}=E_{R1}(\text{eye,paper})+E_{R2}(\text{paper,paper})+E_{R3}(\text{bearing})$$

- $E_{R1}$ is the friction work at the guide of the packaging material web towards the coiler;
- $E_{R2}$ is the friction work when drawing the supply packaging material from for example a packaging material roll;
- $E_{R3}$ is the inner friction of the bearing mounting the gyrating mass.

$$E_{R\ complete}=\int \mu F_N ds^*\text{uncertainty}$$

- $E_{R\ complete}$ is calculated with the exception of an uncertainty of 50%;
- $\mu=0.35$ (determined in experiments);
- $F_N=1$ N (normal force at the guide)
- $\int$ ds (for example at least 3 windings)

The angular velocity of the gyrating mass at time zero (immediately after swinging the flywheel)

Example $$\int ds=3^*(\pi^*10+2^*50)^*1{,}2=473\text{ mm}\leq 500\text{ mm}=0.5\text{ m}$$

$E_{R3}$(estimate)=10% of $E_{R2}$=10% of $E_{R1}$

As the complete energy remains contained in the system, the stored energy equals the friction energy.

$$E_{rot(w)}=E_{R\ com}$$

In an exemplary embodiment of the disclosure, the rotatable gyrating mass is configured such that a rotational energy to be communicated to the rotatable gyrating mass is larger than 0.1 J, 0.15 J, 0.18 J, 0.20 J, 0.22 J or 0.24 J and/or smaller than 10.0 J, 8.0 J, 5.0 J, 4.0 J, 3.8 J, 3.5 J or 3.3 J, so as to provide at least one complete winding of the packaging material web around the coiler core and/or to accelerate the rotatable gyrating mass to a rotational speed of at least 0.5 s$^{-1}$, 0.6 s$^{-1}$, 0.7 s$^{-1}$, 0.8 s$^{-1}$, 0.9 s$^{-1}$ or 1.0 s$^{-1}$ and/or to a rotational speed of less than 10.0 s$^{-1}$, 5.0 s$^{-1}$, 4.0 s$^{-1}$, 3.0 s$^{-1}$, 2.5 s$^{-1}$, 2.0 s$^{-1}$ or 1.8 s$^{-1}$.

The operating person should for example introduce at least 0.28 J [Joule] of rotational energy to wind-up a paper reel with at least 3 windings. The energy to be provided of at least 0.28 J should accelerate the flywheel preferably with an annular bulge on the outer circumference of the flywheel onto a rotational speed no from 1.14 s$^{-1}$ to 1.36 s$^{-1}$.

In an exemplary embodiment of the disclosure, the rotatable gyrating mass can have a flywheel disk-shape or flywheel band-shape, having an axis of symmetry corresponding to the rotary bearing axis of the rotatable gyrating mass. The axis of symmetry may be offset from the axis of rotation in order to simplify threading the packaging material web into the coiler. The circumference of the flywheel may be built with a particularly fully circumferential handle in particular having an axial extension of at least 1 cm and/or no more than 10 cm, which may preferably be designed as a at least partially circumferentially extending solid material bulge or as a particularly open edge flanging and/or as being reinforced in relation to the rest of the gyrating mass body, in particular having the largest axial extension.

In an exemplary embodiment, the drive mechanism comprises a mounted rotary wheel (disk, circle or spoke-type wheel) having at least two essentially parallel coiling prongs which are essentially perpendicular to the rotary wheel and between which a front end of the packaging material strip is received. In case a front end of the preferably hose-shaped packaging material strip is arranged between the coiling prongs of the packaging material reel conversion device, the rotary wheel may be manually turned by operating personnel in order to wind up packaging material reel. The packaging material reel will for example be created with a rotational rate depending on the frequency of rotation of the operating person. The rate of rotation preferably determines the size and/or the diameter of the coiled packaging material reel. Terminating coiling is in particular also manually affected, preferably by manually separating the packaging material strip. Through a primarily provided manual coiling of hose-like packaging materials, which may for example be unwound and/or drawn from the inner side of a material web roll, the operating person may relatively quickly coil packaging material reels, wherein the packaging material reel conversion device only requires little space at the workstation of the operating person.

In an exemplary embodiment, the rotary wheel (disk, circle, wheel) for example comprises a diameter of preferably 100 mm to 2000 mm, in particular 400 mm to 800 mm. The rotary wheel and does not need to be round, but may alternatively be elliptical, polygonal or the like. The rotary wheel forms a (first) lateral guide for guiding/holding a first side of the wound-up packaging material reel in a defined manner, which turns corresponding to the turning movement and is arranged perpendicularly with respect to the coiling axis. A second lateral guide may optionally be provided as a stabilizer of the packaging material reel, in particular of the second side of the packaging material reel. The second lateral guide serves preferably to hold the packaging material reel in a "coiling track" and avoids a sideward drift of the at least one packaging material layer. In a preferred embodiment, the second lateral guide is a stabilizer (staff, rod or the like) perpendicular with respect to the coiling axis, arranged on the coiling prongs and/or essentially parallel to the described (first) lateral guide. Between the first and the proposed second lateral guide, the packaging material reel is coiled. The at least one particularly spring biased stabilizer is preferably inserted into an opening of the coiling prongs (=longitudinal hollow body) and holds the packaging material reel in position. After the coiling process, the at least one second lateral guide is pivoted away through removing the completely coiled packaging material reel in the direction of the coiling axis towards the coiling prongs. For a renewed coiling of a further packaging material reel, the second lateral guide is pivoted up again or raised such that it is essentially parallel to the first lateral guide.

In an exemplary embodiment, the flywheel or the flywheel-disk comprises along its outer edge preferably a handle-bulge for manually driving the flywheel. The handle-bulge may be symmetrical or asymmetrical with respect to the rotary wheel plane. The handle-bulge preferably comprises the same material as the flywheel. In another embodiment, the handle-bulge may consist of a different material than the flywheel and/or the rest of the packaging material reel conversion device.

For simplifying the manual drive of the flywheel, the coiler may additionally or alternatively comprise a rotatable crank or another support means for turning or operating the flywheel and the coiling prongs.

In an exemplary embodiment of the disclosure, the coiler core is formed by at least two coiling prongs or pins (e.g., prongs 33, 35) arranged in a distance with respect to one another, eccentrically with respect to a particularly stationary rotational axis of the rotatable gyrating mass (e.g., flywheel 21), which preferably extend in the form of a rod orthogonally away from a disk-brake basis surface of the rotatable gyrating mass and/or each having a free peeling end, over which the coiled packaging material cushion is detachable, wherein in particular the respective peeling end has a guiding arm (also referred to as "foldable finger" 37 as shown in FIGS. 1-6) moveable (e.g., via pivoting hinge 38) from a peeling position aligned with the longitudinal extension of the respective coiler pin, in which the wound-up packaging material cushion is detachable, into a guiding position inclined relative to the longitudinal extension of the respective coiler pin, in which the guide arm holds the wound-up packaging material cushion laterally on the coiler core, wherein the guide arm (foldable finger 37) is coupled to the respective peeling end of the coiling pin (prongs 33, 35) over a lockable pivoting hinge (hinge 38), wherein in particular the respective guide arm is arranged parallel to a lateral guiding surface of the rotatable gyrating mass in the guide position thereof.

In an exemplary embodiment, the at least two coiling prongs have a length of 40 mm to 800 mm, in particular 16 mm to 200 mm. They are preferably formed as one piece and preferably consist of a material having a yield point of at least 40 MPa until approximately 1600 MPa. The surface finish of the coiler prongs is preferably dependent on the manufacturing process and in average between 0.1 μm and 25 μm. Furthermore, the coiling prongs preferably comprise a constant diameter of 10 to 30 mm, preferably 20 mm, along the length of the coiling prongs. In another advantageous embodiment, the coiling prongs may be designed conically and have a diameter of preferably at least 5 mm and at most 40 mm.

Furthermore it is advantageous that the coiling prongs are arranged in a distance of about 10 mm, preferably 100 mm to 600 mm, from one another. In order to allow for flexibility in the manufacturing of differently formed packaging material reels, the coiling prongs may be arranged in any arbitrary position on the gyrating wheel and in any arbitrary distance from one another. Furthermore, the option to include more than two coiling prongs exists.

Furthermore, the disclosure relates to a packaging material-web coiler for forming a coiled packaging material cushion, such as a cushioning reel. The packaging material web coiler comprises a reception for a packaging material supply, a predeformation station deforming the packaging material drawn from the packaging material supply into a packaging material web, and an above-mentioned drive mechanism according to the disclosure, which in particular is additionally configured to communicate such a drawing force onto the packaging material, that the packaging material is both drawn from the packaging material supply as well as possibly the packaging material being converted into a packaging material web.

Alternatively or additionally to the above-mentioned packaging material web coiler, a packaging material web coiler for forming a coiled packaging material cushion, such as a cushioning reel, may be provided. The packaging material web coiler has a reception for a packaging material reel, from the inner side of which is to be drawn for forming a spiral-hose-shaped packaging material web; at least one coiling core around which the packaging material web is coilable such that the coiled packaging material cushion is detachable from the coiling core, and a manually operable drive mechanism, to which the coiler core is firmly attached and which causes the packaging material web around the coiler core to form the coiled packaging material cushion.

In an exemplary embodiment, the winder or coiler (packaging material reel conversion device; packaging material web coiler) comprises a fixing device. The fixing device can be a sewing prong, which draws a piece of packaging material web through the formed packaging material reel at the end of the packaging material reel, in order to fix the reel with a sewing band or sewing yarn. The application of adhesive tape for attaching the ends of the packaging material reel can be omitted.

In an exemplary embodiment of the disclosure, the predeformation station has a deformation constriction which in particular forces a folding of the packaging material into a hose-shaped packaging material web, when the packaging material is drawn from the drive mechanism through the constriction (needle eye), wherein in particular the constriction has a clearance cross-section in the shape of a circle, a longitudinal slot, a keyhole, a pear, a polygon, an ellipsis or the like.

In an exemplary embodiment of the disclosure, the reception is attached to a reservoir of at least one further packaging material supply, preferably several packaging material supplies, wherein in particular the reservoir, in case of a consumed packaging material in the reception or upon falling below a predetermined amount of packaging material in the reception, automatically extends or retracts the latter in favor of a reception occupied with packaging material, wherein in particular the reservoir is formed as a reception roundabout having at least two reception slots for occupation with a packaging material supply, and/or in which the reception is arranged below the driving mechanism in particular in relation to the rotary axis of the rotatable gyrating mass in a position between 5:00 o'clock and 7:00 o'clock, or in the height of the drive mechanism, in particular in relation to the rotary axis of the rotatable gyrating mass in a position between 2:00 o'clock and 4:00 o'clock, or above the drive mechanism, in particular in relation to the rotary axis of the rotatable gyrating mass in a position between 11:00 o'clock and 1:00 o'clock.

For supplying packaging material, a Leporello-stack and/or packaging material rolls may be provided on an extended reception supply position. The alignment of the paper hose with regard to the coiler may have a special importance. The packaging material reel device is preferably arranged close to the dispensing opening of the packaging material conversion device (for example SpeedMan Classic). The at least two parallel coiling prongs are in particular fastened to a front side of the rotating disc (rotary wheel). On the back side of the rotating disc, a coiler shaft is arranged. It can be rotated clockwise as well as counterclockwise. The paper is a preferably drawn out of the packaging material roll, which is mounted in an angle of approximately 90° with regard to the coiling axis of the packaging material reel conversion device, in particular the reception. In a first embodiment, the packaging material roll may be arranged below the coiler prongs on a common carrier or carrier frame which may be mobile. Thus, the combination of the packaging material device with the packaging material and the packaging material reel conversion device (coiler) may be flexibly pushed to any packing station. Preferably, the packaging material device comprises a holding device for avoiding that the packaging material slides down and out of the roll, due to gravity. In a second embodiment, the packaging material roll may be fastened above the coiling prongs, for example to a carrier at the packaging workspace. These possibilities enable a very space-saving coiling of the packaging material reels in the vertical arrangement. Aside from a vertical arrangement of the packaging material conveyance and a packaging material reel production, the introduction of packaging material may also be provided on the left side or on the right side of the packaging material reel conversion device in a horizontal arrangement. Thereby, the packaging material reel conversion device and the packaging material device may for example be positioned in a mobile frame. The packaging material reel conversion device may be attached via carriers to the packaging material device which is arranged on a mobile frame. Alternatively, the packaging material device coupled to the packaging material reel conversion device may be integrated at a packaging material workspace.

In an exemplary embodiment, of the disclosure, the gyrating mass is associated with a brake configured to brake the flywheel to a predetermined operating state, wherein in particular a movement sensor, such as a rotary encoder, is provided, which cooperates for example with a control electronics such that after reaching a defined size, in particular diameter, of the coiled packaging cushion, the brake is activated, such that in particular the gyrating mass is decelerated. The movement sensor may alternatively or additionally, in particular like a camera, be configured such that an interference of objects, except for the packaging material web, such as an extremity of an operating person, causes a deceleration of the gyrating mass through the brake.

Furthermore, the disclosure relates to a coiled packaging material cushion, such as a cushioning reel, of the packaging paper web in particular coiled through a packaging material web coiler, in particular realized in accordance with the disclosure, being formed through a paper spiral hose formed by unwinding from an inner side of a paper web roll.

In an exemplary embodiment, the coiled packaging material cushion has a disk shape with a disk thickness of less than 40 cm, 35 cm, 30 cm, 25 cm, 20 cm or 15 cm. On an essentially plane circumferential surface of the wound packaging material cushion, a spiral edge may in particular extend essentially rectilinear from one circumferential edge of the disks to the opposite circumferential edge.

In an exemplary embodiment, the packaging material cushion coiled according to the disclosure consists of the packaging paper web without an embossing, particularly an embossing arranged centrally along the longitudinal extension of the packaging paper web, in particular a toothed gear embossing. The packaging material web is free of any embossing deformation which particularly extends in the longitudinal extension of the web direction of the predeformed packaging material web. Such a packaging material web is formed when a packaging material conversion device is used which may for example be described in DE 20 2012 009 025.

In an exemplary embodiment of the disclosure, the packaging material cushion according to the disclosure has a packaging material web including a hose-shaped spiral shape, wherein in particular the spiral shape is formed in that the packaging material is drawn from an inner side of a core-free packaging material web roll. Preferably, the packaging material web consists of a recycling material, in particular paper recycling material.

In an exemplary embodiment, the packaging material cushion has a coiling density (number of windings/mean radius of the cushion) of more than 0.3, 0.4, 0.5, 0.6, or 0.7, in particular in a range of 0.5 to 2.0, preferably 0.7 to 1.8, 0.9 to 1.7, in particular 1.1 to 1.5. In a winding of processes with, for example, 20 rotations due to the rotating gyrating mass, a cushioning reel is formed having a diameter of 200 to 400 mm, in particular 280 to 360 mm. The range of different diameters thereby results from the friction during the winding process. When the friction is increased, the cushioning reel can be coiled more tightly, causing a smaller diameter. In case of a lower friction, the cushion reel is coiled more loosely. A larger diameter is created. The number of windings per diameter (or radius) is close to constant due to the continuous transmission of kinetic energy by the rotatable gyrating mass. Thus, a coiling density of 1.1 to 1.5 results, e.g. per centimeter radius, 1.1 to 1.5 windings are coiled. In this winding process, the packaging material conversion a device according to DE 20 2012 009 025 which shall hereby be included by reference as a part of the present disclosure.

$$\text{Coiling density: } \frac{20\ windings}{14\,\text{cm}} = 1{,}4;$$

for a material web of packaging material conversion device (DE 20 2012 009 025)

In an exemplary embodiment of the disclosure, the packaging material cushion has a larger, particularly 1.5-fold or twice as large, axial deformation resilience than (as) radial deformation resilience. Alternatively or additionally, the ratio of deformation of the packaging material cushion from axial deformation to radial deformation may be smaller than 0.6 or 0.5, in particular, between 0.3 to 0.5, when the packaging material cushion is loaded with the 15- to 45-fold weight of the packaging material cushion. Alternatively or additionally, an axial ratio of deformation of the packaging material cushion of an axial width without axial load to an axial width with an axial load of the 15- to 45-fold of the weight of the packaging material cushion may be larger 0.98 or 0.96, in particular between 0.96 or 0.97 and 1.00. Alternatively or additionally, a radial deformation ratio of the packaging material cushion of a radial width (such as a diameter) without radial load, to a radial width (such as a diameter) without radial load of the 15- to 45-fold of the weight of the packaging material cushion may be smaller 0.55 or 0.5, in particular between 0.5 and 0.25 or 0.3.

In the Table shown below, a cushioning material reel is formed by a spiral-shaped, hose-shaped packaging material web which may for example be formed according to the teaching of DE 20 2012 009 025. This cushion reel is designated in the Table as SpeedMan 70 roll. In two separate rows, the deformation behavior of six packaging cushions (SpeedMan 70 roll) is provided for a respective axial or radial load. For comparison, the same experiment is performed with another cushioning reel made of a predeformed, particularly pre-embossed, packaging material web. The corresponding deformation-/embossing-device is exemplarily taught in DE 10 2012 018867 or DE 10 2012 018941. Both disclosures shall hereby be incorporated by reference in the present disclosure. This cushioning reel is designated in the Table as PaperJet 90 XS.

clearly visible that the deformation of the SpeedMan in the axial direction is significantly lower than for the PaperJet. Quite surprisingly, the SpeedMan has a significantly lower radial shape resiliency in relation to the PaperJet. The SpeedMan is advantageous because of the softness in the axial direction and the rigidity in the axial direction.

For both cushioning reels, the same supply paper material was used. The load weight was 5580 g, wherein a load time of 30 seconds was used. The deformation ratio between axial and radial load is larger for the SpeedMan-cushioning reel in comparison to a PaperJet-cushioning reel. For an axial load, the SpeedMan-cushioning reel only deforms for about 1% or less, whereas it deforms for about 57% in case of a radial load. I. E., in the axial direction, the SpeedMan cushioning reel is very shape-resilient and has an increased deformation capability in radial direction.

Finally, the disclosure relates to a process for manufacturing a coiled packaging material cushion, such as a cushioning reel, wherein the packaging material web is drawn from a packaging material supply. The packaging material web is coiled around the coiler core for forming the packaging material cushion, wherein exclusively a rotational energy of a manually operable rotatable gyrating mass powers the drawing of the packaging material as well as the coiling of the packaging material cushion.

The process according to the disclosure may be performed according to the function of a packaging material web coiler configured according to the disclosure and/or the drive mechanism according to the disclosure.

In FIG. 1, the packaging material web coiler according to an exemplary embodiment of the disclosure is designated with reference numeral 1. The packaging material web coiler 1 has a bowl receptacle 3 for receiving a packaging material roll 7. This packaging material reception 3 has a truncated-cone-shaped dispensing constriction 5 defining a dispensing

TABLE deformation ratio for axial and rectilinear load

| trial No. | paper | load direction — | wall roll mm | Ø reel mm | weight g | height0 mm | height 1 mm | Deformation ratio h1/h2 | mean deformation ratio h1/h2 |
|---|---|---|---|---|---|---|---|---|---|
| 1 | PaperJet 90KS | radial | — | 30 | 186 | 300 | 175 | 0.58 | 0.60 |
| 2 | PaperJet 90KS | radial | — | 305 | 187 | 305 | 186 | 0.61 | |
| 3 | PaperJet 90KS | radial | — | 305 | 186 | 305 | 195 | 0.64 | |
| 4 | PaperJet 90KS | radial | — | 215 | 110 | 215 | 130 | 0.60 | |
| 5 | PaperJet 90KS | radial | — | 205 | 109 | 205 | 115 | 0.56 | |
| 6 | PaperJet 90KS | radial | — | 200 | 110 | 200 | 120 | 0.60 | |
| 1 | PaperJet 90KS | axial | — | 285 | 183 | 140 | 128 | 0.91 | 0.94 |
| 2 | PaperJet 90KS | axial | — | 300 | 185 | 143 | 135 | 0.94 | |
| 3 | PaperJet 90KS | axial | — | 300 | 185 | 145 | 138 | 0.95 | |
| 4 | PaperJet 90KS | axial | — | 205 | 111 | 150 | 135 | 0.90 | |
| 5 | PaperJet 90KS | axial | — | 195 | 111 | 150 | 142 | 0.95 | |
| 6 | PaperJet 90KS | axial | — | 210 | 112 | 148 | 143 | 0.97 | |
| 1 | SpeedMan 70 Roll | radial | 70 | 300 | 369 | 300 | 130 | 0.43 | 0.43 |
| 2 | SpeedMan 70 Roll | radial | 70 | 305 | 313 | 305 | 126 | 0.41 | |
| 3 | SpeedMan 70 Roll | radial | 65 | 300 | 283 | 300 | 125 | 0.42 | |
| 4 | SpeedMan 70 Roll | radial | 80 | 215 | 201 | 215 | 103 | 0.48 | |
| 5 | SpeedMan 70 Roll | radial | 60 | 210 | 142 | 210 | 75 | 0.36 | |
| 6 | SpeedMan 70 Roll | radial | 80 | 215 | 224 | 115 | 102 | 0.47 | |
| 1 | SpeedMan 70 Roll | axial | 50 | 300 | 286 | 143 | 142 | 0.99 | 0.99 |
| 2 | SpeedMan 70 Roll | axial | 50 | 250 | 283 | 140 | 140 | 1.00 | |
| 3 | SpeedMan 70 Roll | axial | 60 | 250 | 236 | 140 | 139 | 0.99 | |
| 4 | SpeedMan 70 Roll | axial | 50 | 215 | 171 | 140 | 138 | 0.99 | |
| 5 | SpeedMan 70 Roll | axial | 50 | 205 | 189 | 141 | 139 | 0.99 | |
| 6 | SpeedMan 70 Roll | axial | 80 | 215 | 180 | 140 | 140 | 1.00 | |

The comparison should be performed with cushioning reels having essentially the same diameter. Due to the significantly denser coiling density according to the disclosure, a higher weight is achievable for the SpeedMan. It is opening at which a hose-shaped and spiral-shaped packaging material web 8 can be drawn either on the one hand as a finished packaging material which may be processed individually or, on the other hand, to serve as an intermediate product for a subsequent coiling in accordance with the disclosure. The packaging material web 8 has a spiral-shaped hose-shape created by drawing from the inner side of the packaging material roll 7 as explained for example in DE 20 2012 009 025 which it shall be understood to be in incorporated by reference for the description of the present subject matter and in particular of the packaging material conversion device.

The bowl receptacle 3 is attached to a movable rack 11 comprising a carriage 13 formed in a cross-shape having freely rotatable wheels at the cross bracket ends. The support 11 has a support pillar 15 to which the bowl receptacle 3 is fastened and on the upper side of which the drive mechanism (21) according to the disclosure is formed. A drive mechanism according to the disclosure is formed as a flywheel 21 mounted freely rotatable to the upper end of the pillar 15 with roller bearings.

Between the dispensing opening 23 of the packaging material deformation device and the flywheel 25, and encompassing guide, such as a guide-through-constriction 27, is provided, which particularly acts as a needle eye. The guide-through-constriction 27 leads the packaging material web towards the drive mechanism according to the disclosure in form of the flywheel 21.

The flywheel 21 is formed as a disk 25 and has a support surface 31 from which two coiler prongs 33, 35 extend perpendicularly. The pair of coiler prongs forms the coiler core around which the packaging material web 8 shall be coiled. The pair of coiler prongs is attached in a flywheel-fast manner. It shall be clear that a step-up transmission or reduction transmission can be arranged between the coiler core and the flywheel 21 so as to provide a desired angular velocity of the flywheel 21.

On one or both prongs 33, 35, a foldable finger 37 (e.g. guiding arm) is provided in order to hold the cushioning reel 53 which is not shown in detail in this figure to the prong 33, 35 when the same is folded perpendicularly (e.g. via pivoting hinge 38). The cushioning reel 53 shall also be held by the support surface 31 wherein a biased finger 37 shall push the cushioning reel 53 against the support surface 31. The finger 37 can be spring-biased (e.g. at pivoting hinge 38) such that it may always return to the position perpendicular or parallel to the flywheel 21 by itself.

The flywheel 21 has a broad actuation bulge 26 that may be up to 5 cm large in order to be easily grippable by an operating person.

In order to initiate the packaging material web coiler 1, the operating person draws the spiral-shaped packaging material web 8 out of the opening 23 and guides it through the constriction 27 to both of the prongs 33, 35, as shown in FIG. 2. The flywheel 21 shall not be actuated yet.

According to FIG. 3, the packaging material web 8 is manually (m) threaded between both of the prongs 33, 35. Afterwards, the operating person actuates the flywheel 21 wherein the rotary direction may be selected as desired. As indicated in FIG. 2 by both rotary arrows P, the flywheel 21 is set into a rotary motion. Due to the mass inertia of the gyrating mass of the flywheel 21 and because of the engagement of the prongs 33, 35 into the packaging material web 8, the latter is eventually coiled into a cushioning reel as schematically shown in FIG. 7.

In FIG. 4, a different arrangement of the packaging material conversion device is shown in view of the flywheel 21. The dispensing axis of the opening 23 is offset in its extension from the rotary axis which renders threading and initial coiling easier. Preferably, the dispensing direction of the packaging material conversion device is configured such that it meets one of the prongs 35, 33.

It shall be clear that the orientation of the packaging material conversion device as shown in FIG. 5 may alternatively be arranged such that the dispensing axis crosses the rotary axis S of the flywheel 21.

In FIG. 6, a further embodiment of the packaging material web coiler according to the disclosure is shown in which the reception 3 is simply formed by a table, attached to the pillar 15 of the support.

The embodiment according to FIG. 7 differs from that of FIG. 1 in that the carriage 13 is provided with a particularly rotatably mounted plate for receiving several packaging material rolls 7 in order to immediately access the next one upon consumption of one packaging material roll 7.

In FIG. 8, a flywheel 21 according to the disclosure is shown in detail, wherein it is visible that both prongs 33, 35 are parallel to one another and perpendicular with respect to a support surface 31 of the flywheel-disk 25. Both prongs 33, 35 extend for approximately the radius of the flywheel 21.

The shape of the flywheel 21 is for example formed in the shape of the disk 25 width a flanged circumference in order to enable simple gripping and swinging for turning of the flywheel 21. Alternatively, the flywheel 21 may, as in FIG. 10, be formed by a bulge 26 which may be formed as a solid material to increase mass inertia, or hollow.

In order to evaluate the cushioning characteristics of the reel cushion according to the disclosure, an experimental setting shown in FIG. 11, wherein the cushioning reel 53 is arranged between pressure disk 51 and a particularly stationary counter pressure plate 55. A threaded rod 57 extends through the counter pressure plate to the pressure disk wherein the pressure disk is connected with the lower pressure disk 61 with the measuring device 63.

Upon actuation of the threaded rod 57, thereby, a precisely measured pressure can be provided to the cushioning material. A measuring device measures the deformation of the cushioning reel 53 either in the axial direction, as shown in FIG. 12, or in the radial direction. Alternatively with regard to a threaded rod it is possible to simply work with a mass. The experimental results are shown in the Table discussed in more detail below.

In FIGS. 14 through 17, different cushioning reels 53 are schematically shown. An essentially fundamental cushioning reel is shown in FIG. 15 which has precisely three windings. This small cushioning reel 53 serves to cushion smaller volumes. The other cushioning reels according to FIGS. 14, 16 and 17 are broader cushioning reels 53 with significantly more windings. The particularly high rigidity of the cushioning reel 53 in the axial direction is achieved due to the high coiling density which is achieved because the packaging material dispensing web is provided in a spiral shape without an embossing. Additionally it was shown that the spiral-shaped hose shape is of advantage when coiling because the web edge running at an inclination, which is visible on the outer side of the cushion, creates a catch. On the other hand, the spiral-shaped hose shape allows for a movement of the spiral windings in case of the load in the radial direction.

The features disclosed in the previous description, the figures and the claims may be of relevance for the realization of the disclosure in the different embodiments thereof both individually as well as in any combination thereof.

To enable those skilled in the art to better understand the solution of the present disclosure, the technical solution in the embodiments of the present disclosure is described clearly and completely below in conjunction with the drawings in the embodiments of the present disclosure. Obviously, the embodiments described are only some, not all, of the embodiments of the present disclosure. All other embodiments obtained by those skilled in the art on the basis of the embodiments in the present disclosure without any creative effort should fall within the scope of protection of the present disclosure.

It should be noted that the terms "first", "second", etc. in the description, claims and abovementioned drawings of the present disclosure are used to distinguish between similar objects, but not necessarily used to describe a specific order or sequence. It should be understood that data used in this way can be interchanged as appropriate so that the embodiments of the present disclosure described here can be implemented in an order other than those shown or described here. In addition, the terms "comprise" and "have" and any variants thereof are intended to cover non-exclusive inclusion. For example, a process, method, system, product or equipment comprising a series of steps or modules or units is not necessarily limited to those steps or modules or units which are clearly listed, but may comprise other steps or modules or units which are not clearly listed or are intrinsic to such processes, methods, products or equipment.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

REFERENCE LIST

1 packaging material web coiler
3 reception
5 constriction
7 packaging material roll
8 packaging material web
11 support
13 carriage
15 pillar
21 flywheel/drive mechanism
23 dispensing opening
25 disk/flywheel
27 constriction
31 support surface
33, 35 prong
37 finger
51, 61 pressure disk
53 cushioning reel
55 counter pressure plate
57 threaded rod
63 measuring device
P rotary arrow
S rotary axis

The invention claimed is:

1. A drive mechanism for a packaging material web coiler for forming a wound-up packaging material cushion, comprising:

a coiler core including at least two coiler pins distanced from one another, the coiler core being configured: to coil the coiled packaging material web around the coiler core to form the coiled packaging material cushion, and such that the coiled packaging material cushion is detachable from the coiler core; and a rotatable gyrating mass coupled to the coiler core and configured to perform at least one complete winding of the packaging material web around the coiler core in response to a manual swing-actuation, the rotatable gyrating mass including a circumferential handle arranged on a circumference of the rotatable gyrating mass and configured as an annular bulge having a larger axial dimension than a remainder of the rotatable gyrating mass, wherein each of the at least two coiler pins being formed as a rod extending orthogonally from a support surface of the rotatable gyrating mass, each of the rods including a first end connected to the support surface and a second end opposite the first end in an axial direction, and the at least two coiler pins being eccentrically positioned on the support surface with respect to a rotary bearing axis of the rotatable gyrating mass, and wherein at least one of the second ends includes a movable member that is movably connected to the at least one second end.

2. The drive mechanism according to claim 1, wherein the rotatable gyrating mass is configured to form the wound-up packaging material cushion based exclusively on a kinetic rotational energy transferred to the rotatable gyrating mass by a manual actuation and a hand force of a manual operator communicated directly to the circumferential handle of the rotatable gyrating mass.

3. The drive mechanism according to claim 1, wherein the rotatable gyrating mass is configured for a mass moment of inertia of more than 30 $kg/cm^2$ and less than 500 $kg/cm^2$, the rotatable gyrating mass being realized as a flywheel having an outer diameter of less than 100 cm, and/or more than 10 cm.

4. The drive mechanism according to claim 1, wherein, in response to a rotational energy being communicated to the rotatable gyrating mass, the rotatable gyrating mass is configured to accelerate to a rotational speed of at least 0.5 $s^{-1}$ and/or less than 10.0 $s^{-1}$ to provide at least one complete winding of the packaging material web around the coiler core.

5. The drive mechanism according to claim 1, wherein:

the rotatable gyrating mass includes a disk-flywheel or band-flywheel shape, having an axis of symmetry corresponding with the rotary bearing axis of the rotatable gyrating mass, and the circumferential handle is reinforced in relation to the remainder of the rotatable gyrating mass.

6. The drive mechanism according to claim 1, wherein:

the second end is a free end over which the wound-up packaging material cushion is detachable, the movable member is configured to be moveable from a first position aligned with the axial direction, in which the wound-up packaging material cushion is detachable, into a second position inclined relative to the axial direction, in which the movable member is configured to hold the wound-up packaging material cushion laterally on the coiler core, the movable member is coupled to its respective peeling-second end with a lockable pivoting hinge, and the movable member, in the second position, is arranged in parallel with respect to the support surface of the rotatable gyrating mass.

7. A packaging material web coiler configured to form a wound-up packaging material cushion, comprising:

a reception configured to receive a packaging material supply, a predeformation station configured to deform packaging material drawn from the packaging material supply into a packaging material web, and the drive mechanism according to claim 1 configured to communicate, to the packaging material, a drawing force to draw the packaging material from the packaging material supply and deform the drawn packaging material into the packaging material web.

8. The packaging material web coiler according to claim 7, wherein the predeformation station comprises a deformation constrictor configured to force a folding of the packaging material into a hose-shaped packaging material web when the packaging material is drawn through the deformation constrictor by the driving mechanism, wherein the deformation constrictor has a cross section shaped as a circle, a longitudinal slot, a keyhole, a pear, a polygon, or an ellipsis.

9. The packaging material web coiler according to claim 7, wherein:

the reception is connected with a reservoir of at least one further packaging material supply, the reservoir being configured to automatically extend or retract the reception in favor an occupied reception with packaging material in case of a consumed packaging material in the reception or upon falling below a predetermined amount of packaging material, and the reservoir is formed as a reception roundabout having at least two reception slots for occupation with a packaging material supply, and/or the reception is arranged below the driving mechanism in relation to the rotary bearing axis of the rotatable gyrating mass of the driving mechanism.

10. The packaging material web coiler according to claim 9, wherein the packaging material web coiler is configured to decelerate the rotatable gyrating mass to a predetermined operative state based on:

a detected defined size of the coiled packaging cushion; and/or a detected interference of the packaging material web coiler by one or more objects other than the packaging material web.

11. A coiled packaging material cushion of a packaging material web coiled through a packaging material web coiler according to claim 7, being formed by a paper spiral hose drawn from an inner side of a paper web roll.

12. The coiled packaging material cushion according to claim 11, wherein the coiled packaging material cushion includes: a disk shape with a disk thickness of less than 40 cm, 35 cm, 30 cm, 25 cm, 20 cm or 15 cm.

13. The coiled packaging material cushion according to claim 11, wherein the packaging material web includes a coiling density in a range of 0.5 to 2.0, the coiling density being defined by:

$$\frac{N}{M}$$

where N is a number of windings and M is a mean radius of the cushion.

14. The coiled packaging material cushion according to claim 11, wherein:

the packaging material web to be coiled has a hose-shaped spiral shape, the hose-shaped spiral shape being formed by drawing of the packaging material from an inner side of a core-free packaging material web roll; and/or the packaging material web includes a paper recycling material.

15. The coiled packaging material cushion according to claim 11, wherein:

the packaging material cushion has a deformation rigidity larger than a radial deformation rigidity;

a ratio of deformation of a packaging material cushion for a predetermined load is between an axial deformation and a radial deformation of between 0.3 to 0.5;

an axial ratio of deformation of the packaging material cushion of an axial width without axial load to an axial width at an axial load of the 15- to 25-fold of a weight of the packaging material cushion is larger than 0.95; and/or a radial ratio of deformation of the packaging material cushion defined as a radial width without radial load with regard to a radial width at a radial load of the 15- to 45-fold of the weight of the packaging material cushion is between 0.25 and 0.5.

16. The drive mechanism according to claim 1, wherein the rotatable gyrating mass includes a disk-flywheel shape or band-flywheel shape, having an axis of symmetry corresponding with a rotary bearing axis of the rotatable gyrating mass.

17. The drive mechanism according to claim 1, wherein the rotatable gyrating mass includes a disk-flywheel or band-flywheel shape, the solid-annular bulge of the circumferential handle being configured as a ring torus.

18. The drive mechanism according to claim 1, wherein the circumferential handle increases a mass moment of inertia of the rotatable gyrating mass.

19. The drive mechanism according to claim 1, wherein the movable member is configured to selectively move between a first position in which the movable member extends in the axial direction and a second position in which the movable member extends parallel to the support surface.

20. The drive mechanism according to claim 1, wherein:

the rotatable gyrating mass includes a disk-flywheel or band-flywheel shape, having an axis of symmetry corresponding with the rotary bearing axis of the rotatable gyrating mass, and the circumferential handle is reinforced in relation to the remainder of the rotatable gyrating mass, the annular bulge of the circumferential handle being configured as a ring torus.

21. The drive mechanism according to claim 1, wherein the annular bulge is a solid annular bulge.

22. A drive mechanism for a packaging material web coiler for forming a wound-up packaging material cushion, comprising:

a coiler core including at least two coiler pins distanced from one another, the coiler core being configured: to coil the coiled packaging material web around the coiler core to form the coiled packaging material cushion, and such that the coiled packaging material cushion is detachable from the coiler core; and a rotatable gyrating mass coupled to the coiler core and including a circumferential handle arranged on a circumference of the rotatable gyrating mass, the rotatable gyrating mass being configured to, in response to a manual swing-actuation applied via the circumferential handle causing a rotational energy to be communicated to the rotatable gyrating mass, accelerate to a rotational speed of at least 0.5 $s^{-1}$ and/or less than 10.0 $s^{-1}$ and perform at least one complete winding of the packaging material web around the coiler core in response to a manual swing-actuation, wherein the circumferential handle is configured as an annular bulge having a larger axial dimension than a remainder of the rotatable gyrating mass, wherein each of the at least two coiler pins being formed as a rod extending orthogonally from a support surface of the rotatable gyrating mass, each of the rods including a first end connected to the support surface and a second end opposite the first end in an axial direction, and the at least two coiler pins being eccentrically positioned on the support surface with respect to a rotary bearing axis of the rotatable gyrating mass, and wherein at least one of the second ends includes a movable member that is movably connected to the at least one second end.

23. A drive mechanism for a packaging material web coiler for forming a wound-up packaging material cushion, comprising:

a coiler core including at least two coiler pins distanced from one another, the coiler core being configured to coil the coiled packaging material web around the coiler core to form the coiled packaging material cushion, and such that the coiled packaging material cushion is detachable from the coiler core; and a rotatable gyrating mass rigidly coupled to the coiler core in a rotationally fixed manner, the rotatable gyrating mass being configured to perform at least one complete winding of the packaging material web around the coiler core in response to a manual swing-actuation, and the rotatable gyrating mass including a circumferential handle arranged on a circumference of the rotatable gyrating mass and configured as a ring torus having a larger axial dimension than a remainder of the rotatable gyrating mass, wherein each of the at least two coiler pins being formed as a rod extending orthogonally from a support surface of the rotatable gyrating mass, each of the rods including a first end connected to the support surface and a second end opposite the first end in an axial direction, and the at least two coiler pins being eccentrically positioned on the support surface with respect to a rotary bearing axis of the rotatable gyrating mass, and wherein at least one of the second ends includes a movable member that is movably connected to the at least one second end.

* * * * *